Figure 1:
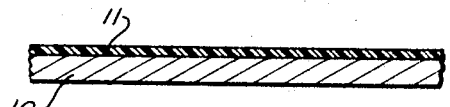

3,443,983
FILM FORMING COMPOSITION AND PROTECTED METAL ARTICLES UTILIZING THE SAME
Sherwin A. Golding, Pittsburgh, and John E. Summers, McMurray, Pa., assignors to H. H. Robertson Company, Pittsburgh, Pa., a corporation of Pennsylvania
Filed Oct. 28, 1966, Ser. No. 590,375
Int. Cl. B32b 15/08; C23f 11/14
U.S. Cl. 117—75       9 Claims The present invention concerns a film-forming composition, and protected metal sheets utilizing the same.

Prior art

Protected metal sheeting is widely used in the building industry for roofing, siding and panels which are exposed to external weathering and atmospheric corrosion and errosion. One commercially successful protected metal sheeting product is sold under the registered trademark, Galbestos. The product is manufactured by impressing a fibrous sheet into a molten zinc coating on a steel core. Subsequently, the fibrous sheet is saturated with a bituminous material. Thereafter a weather resistant outer coating is applied. The Galbestos process is described, for example, in U.S. Patents 2,073,334, 3,262,192, and 3,274,679.

The Galbestos product is manufactured by a complex process which has been justified by the outstanding weather resistance of resulting product.

Substantial efforts have been expended to seek more easily manufactured products which will exhibit weathering properties comparable to those of the Galbestos product. Heretofore, such efforts have not been successful. One requirement for the protected metal sheet is that the coating be tenaciously adherent. Another requirement is that the outer coating retain flexibility to permit post-forming of the protected metal sheet without loss of the coating integrity. A further requirement is that the protected metal sheet be available in a variety of permanent colors. Among the materials which have been evaluated for use as protected metal coatings are blends of coal tar and epoxy resins, for example, as described in Canadian Patent 690,400; U.S. Patents 3,006,877, 2,765,288; and blends of epoxy resins and petroleum asphalts, as described, for example, in U.S. Patent 2,906,720. The epoxy coatings have been considered a likely material for investigation as an alternative means for preparing protected metal sheets because of the tenacious adherent properties of epoxy resins with metal substrates. All of the epoxy resin and bituminous composition blends which have been evaluated have been unsuccessful because of the brittleness and the difficulty of application of the coating.

According to the present invention we have discovered a film-forming composition utilizing epoxy resins which can be applied to a metal substrate to produce a protected metal sheet which exhibits satisfactory performance in all of the required characteristics.

Statement of the invention

According to this invention the film-forming composition which we have discovered includes:

(a) a polyamine resin;
(b) an epoxy resin;
(c) a fatty acid pitch;
(d) a particulate inorganic filler.

The described ingredients may be physically mixed in the proportions which will be hereinafter set forth and applied directly to a metal substrate which is subsequently baked to cure the composition as a protected metal film coating. Room temperature cure of the coatings can be achieved although the required time is not commercially feasible. Alternatively, the composition may be reduced with a suitable solvent composition to allow spray coating of metal substrates.

Objects

The principal object of this invention is to provide a film-forming composition adapted to particular use as a protected metal sheet coating.

A further object of this invention is to provide a method for making protected metal sheets.

A still further object of this invention is to provide protected metal sheets having a new and different composition.

These and other objects and advantages of the present invention will be described more fully in the following detailed description of the invention and the accompanying drawings in which:

FIGURES 1 through 4 are cross-sectional views of metal sheets having the present protective coating applied to one or both surfaces.

Example

The following ingredients were combined in a mixing container to form a "binder composition":

| | Pounds |
|---|---|
| Commercial diluted epoxy resin, specifically Epi-Rez-5077 | 45.5 |
| Polyamide resin, specifically Versamide-125 | 19.5 |
| Stearine pitch | 35 |

The diluted epoxy resin was a trademark product known as Epi-Rez-5077, which is a mixture of an aromatic monoglycidyl ether as a reactive diluent in a bisphenol-A epoxy resin. The diluted epoxy resin has a viscosity of (77° F.) of 500–700 centipoises; a density of 9.40–9.57 pounds per gallon; and an epoxide equivalent of 185–193.

The polyamide resin modifier was a commercial liquid product understood to be the amine-terminated polyamide of dilinoleic acid and ethylene diamine and other amines such as tertiary amines, e.g., ethylene triamine. The molecular weight of the polyamide material was in the range of 3,000 to 10,000. The polyamide had an amine value of 330–360.

Stearine pitch is obtained from the distillation of natural oil-containing materials of animal origin. The stearine pitch is commercially available having melting points from about 80 °F. to about 200° F.

The binder composition, 100 pounds, was combined with 33.3 pounds of a finely divided particulate filler, specifically, calcium carbonate.

The material was applied without dilution to an 18-gauge galvanized steel sheet by draw-down techniques to a 3-mil thickness. Some specimens were air cured at room temperature after about 24 hours. Other specimens were force-cured by heating to about 425° F. for about 5 minutes. Both the air-cured and force-cured specimens presented a shiny coating, free of surface imperfections. The coatings were strongly adherent as evidenced by the deliberate removal of coating chips. The chips present a film of the zinciferous coating, indicating that the separation of the cured resinous coating occurs through delamination of the metal layer between the steel substrate and the protective resinous coating.

Both the air-cured specimens and the force-cured specimens were bent 180° over a ⅛-inch diameter rod without delamination of the coating. The cured coating, even in the region of the bend, is free from cracking, indicating excellent ductility.

The same coating can be applied to other metal substrates including terneplate and tin plate. Preliminary passivating treatments of the galvanized sheet, such as phosphatizing or chromating, do not interfere with the present coating performance.

The described coating is particularly well suited for subsequent application of weather-proof coverings such as baked-on coatings, rolled-on coatings, sprayed-on coatings of alkyds, polyesters, acrylics, silicone alkyds, silicone acrylics, PVC and PVF compositions. The present modified epoxy coating is applied to the metal substrate in thicknesses ranging from about 2 mils to about 10 mils. The resulting coated metal sheet is protected against chemical corrosion, thermal shock and mechanical impact.

The polyamide resin

The polyamide resins of the present compositions are obtained by heating polyfunctional amines such as diamines and tertiary amines with polymeric fatty acids such as linoleic acid, soybean oil acids, castor oil acids, linseed oil acids, tung oil acids, and polymers thereof. The polyfunctional amines react with the fatty acids to form amide linkages and leave residual terminal amine groups.

The epoxy resin

For the present purposes, any polyepoxy resin capable of curing with polyamides is useful. The polyepoxy resins derived from Bisphenol-A are particularly well suited. These resins can be combined with other epoxy additives for viscosity adjustment, e.g., aromatic mono-glycidyl ethers. Mixtures of such aromatic mono-glycidyl ethers and Bisphenol-A polyepoxy resins are commercially available.

The fatty acid pitch

Fatty acid pitches are obtained by distillation of natural oil containing materials of animal or vegetable origin such as tallow, palm oil, bone-fat, lard, cottonseed oil, fish, soapstock, and the like. The preferred pitch is stearine pitch which is obtained as a bottom product from distillation of animal components. The present compositions utilizing stearine pitch are superior to the similar compositions formulated with other fatty acid pitches. For example the stearine pitch composition has better stability than a corresponding cottonseed oil pitch composition. In fact compositions using a blend of stearine pitch and cottonseed oil pitch have been stability than similar compositions employing the cottonseed oil pitch alone. Cottonseed oil pitch alone, as the fatty acid pitch in the present compositions, allows some phase separation to occur. The surfaces of the resulting coated sheets have a mottled appearance. However, by mixing cottonseed oil pitch and stearine pitch, the dispersion of the composition is improved and phase separation is avoided. Tallow oil pitch has a disagreeable odor which may restrict its use in the present compositions.

The particulate filler

The particulate filler substance in the present coating material is a low oil-absorbent material and is non-reactive with the other components. In addition to calcium carbonate, other suitable fillers include talc, ground glass, mica, silicates, barytes and many other inert substances including metallic flakes and powders.

Proportions

The overall composition of the present coating material includes:

A. A polyamide resin modifier containing terminal amine groups;
B. A polyepoxy resinous material containing terminal epoxy groups in the proportion of about 1 to 4 parts by weight of the polyepoxy resinous material for every one part by weight of polyamide resinous material;
C. Fatty-acid pitch in the proportion of about 0.2 to 1.0 part by weight fatty-acid pitch for every one part by weight of the components A and B;
D. Finely divided inert particulate inorganic filler in the proportion of about 0.05 to 0.50 part by weight filler for every part by weight of the components A, B and C. Note that the mixture of A, B and C is referred to herein as the "binder composition."

Application and curing

Preferably the present coating composition is reduced with suitable solvents to allow spray-coating, roll-coating, curtain-coating, flow-coating, dipping or brush application. The coating composition also may be used in its unreduced form although the pot life of the unreduced coating composition is only about 8 to 10 hours. Solvent-reduced compositions have a demonstrated pot life in excess of 24 hours. Suitable solvents include xylol, toluene, glycol ethers, high boiling aromatic coal-tar solvents, and the like.

While air curing of the present compositions at room temperature is feasible, the preferred curing is carried out at elevated temperatures. Curing at high temperatures of 300 to 500° F. is preferred. Temperatures above 500° F. tend to embrittle the coatings.

At the elevated temperature, curing can be achieved in about one to five minutes.

Preferably a compatibilizing agent is added to the coating mixture, such as cellulose acetate butyrate, silicone resins, urea resins or urea itself. The compatibilizing agent is present in an amount from about 0.1 to about 5 percent by weight of the total coating composition (binder plus filler).

Referring to FIGURE 1 there is illustrated a metal substrate 10 having the present protective coating 11 applied to one exposed surface. The exposed surface of the metal substrate 10 can be the basic metal itself or a metallic coating for the metal core such as a galvanized coating on steel, an aluminum coating on steel, a galvanized coating which has been subjected to a passivating treatment such as Bonderizing or Parkerizing or similar phosphatizing or chromating.

Figure 2:
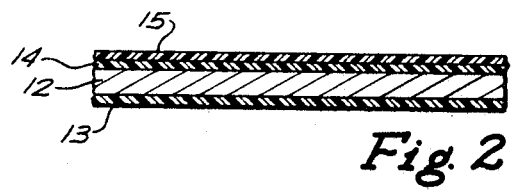

FIGURE 2 illustrates a metal substrate 12 having the present protective coating 13, 14 applied over both surfaces. A weatherproof outer coating 15 is applied over one of the protective coatings 14. The weatherproof outer coating 15 may comprise an alkyd resin coating, a polyester coating, an acrylic coating, a silicone acrylic coating, a silicone alkyd coating, PVF or PVC coatings, and the like.

Figure 3:
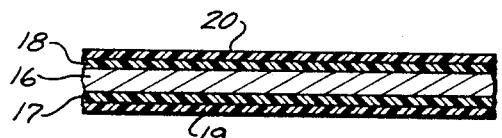

FIGURE 3 illustrates a metal substrate 16 having the present protective coating 17, 18 over both surfaces and having a weather resistant outer coating 19, 20 applied externally over both of the present protective coatings 17, 18 respectively.

Figure 4:
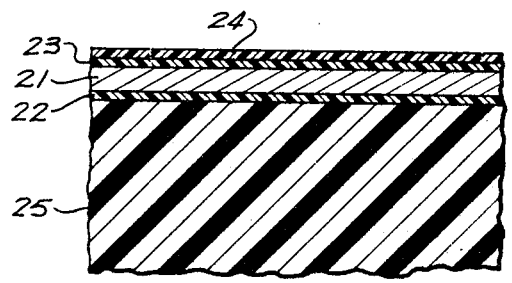

FIGURE 4 illustrates a metal substrate 21 having the present protective coating 22, 23 applied to both surfaces and having a weatherproof outer coating 24 applied over the protective coating 23. A rigid foamed-plastic coating 25 is applied over the protective coating 22 to serve as thermal insulation for the metal substrate 21. The rigid foamed-plastic coating 25 preferably comprises foamed polyurethane.

The protected metal sheets shown in FIGURES 2, 3 and 4 have utility in the building-construction field as roofing materials, as sidewall sheathing materials, as components for building panels and as stock for fabricating structures such as ventilators, louvers, canopies, hatch-covers, and the like. The materials of FIGURES 2 and 3 can be coated as flat sheets and subsequently corrugated by bending or rolling to desired construction profiles. The foamed-plastic coating 25 of FIGURE 4 is applied to a previously formed building sheet as shown in FIGURE 2.

Comparison with prior art

In the course of investigating the present coating composition, applicants learned of the superficially similar protective coating described in U.S. Patent 2,824,078 which combines polyepoxide resin and a condensate material obtained by reacting a polyamine with a fatty acid pitch such as stearine pitch. That coating material has been prepared, tested and found to be unacceptable for the present protective metal coating requirement.

Following the procedures set forth in U.S. Patent 2,824,078, applicants combined 209 grams of stearine pitch with 43 grams of ethylene diamine in a reaction flask equipped with a stirrer, a thermometer and a water trap. The stearine pitch was added initially to the reaction flask and heated to obtain fluidity. The diamine was added and the two materials were heated to 350° F. in two hours and maintained at 355° F. for an additional two hours. A condensate of the ethylene diamine and stearine pitch was obtained. That condensate was heated to 150° F. and combined with an equal amount of a commercial polyepoxide resin, specifically Epon 828. The mixture thereafter was heated to 210° F. and stirred for five minutes before application to a galvanized steel sheet by draw-down technique with a six-mil doctor blade. Several panels were air-cured for 24 hours. Several panels were force-cured by heating to 200° F. for five minutes. The composition exhibited extremely short pot life and presented a high viscosity which prevented uniform application by doctor-blade draw-down technique. The resulting coatings were uneven in appearance and texture. The material could be a useful composition for application by means of brush to substrates such as pipe joints where a smooth, even finish is not a product requirement. The coating was typical of most amine-cured polyepoxy materials—that is, the coating was hard, tightly adherent, yet brittle and inflexible. When the films were tested by bending the coated metal sheets over a ½-inch diameter rod, the coatings flaked off in the region of the bend. The material presented a black, glossy, hard appearance and tenaciously adhered to the metal sheet as described in U.S. Patent 2,824,078.

Quite in contrast, the present coating composition allowed 180° bending of the coated metal sheets over a ⅛-inch diameter rod without flaking or cracking, indicating the achievement of ductility which is required in a building sheet.

Additional features

The present protective coatings can be pigmented with colored fillers to provide a variety of different color effects. Use of metal powders or metallic flakes in combination with brightly colored pigments achieves attractive metal-like surfaces. The metal powders or flakes constitute a portion of the particulate inorganic filler component.

We claim:
1. A metal sheet having on at least one surface thereof a firmly adherent flexible protective resin film coating which comprises a high temperature reaction product of a mixture of
   (a) a polyamide resinous material containing terminal amine groups;
   (b) an epoxy resinous material containing terminal epoxy groups in a proportion of about 1 to 4 parts by weight epoxy resinous material for every one part by weight of polyamide resinous material;
   (c) fatty-acid pitch in the proportion of about 0.2 to 1.0 part by weight fatty-acid pitch for every one part by weight of components (a) and (b);
   (d) finely divided inert particulate inorganic filler in the proportion of about 0.05 to 0.50 part by weight of said filler for every one part by weight of components (a), (b) and (c).
2. A film-forming composition including
   (a) a polyamide resinous material containing terminal amine groups;
   (b) an epoxy resinous material containing terminal epoxy groups in a proportion of about 1 to 4 parts by weight epoxy resinous material for every one part by weight of polyamide resinous material;
   (c) fatty-acid pitch in the proportion of about 0.2 to 1.0 part by weight fatty-acid pitch for every one part by weight of components (a) and (b);
   (d) finely divided inert particulate inorganic filler in the proportion of about 0.05 to 0.50 part by weight of said filler for every one part by weight of components (a), (b) and (c).
3. The composition of claim 2 including from about 0.1 to 5 percent by weight of a compatibilizing agent.
4. The metal sheet of claim 1 wherein the fatty-acid pitch is stearine pitch.
5. The composition of claim 2 wherein the fatty-acid pitch is stearine pitch.
6. The metal sheet of claim 1 having a resinous weatherproof outer coating applied over the said resin film.
7. The metal sheet of claim 1 having a coating of rigid foamed plastic adhered to one said resin film.
8. The metal sheet of claim 1 wherein the fatty-acid pitch component is a mixture of stearine pitch and another fatty-acid pitch.
9. The composition of claim 2 wherein the fatty-acid pitch component is a mixture of stearine pitch and another fatty-acid pitch.

References Cited

UNITED STATES PATENTS

| | | | |
|---|---|---|---|
| 2,824,078 | 2/1958 | Mellick | 260—28 |
| 3,024,130 | 3/1962 | Kish | 117—92 X |
| 3,042,545 | 7/1962 | Kienle et al. | |

FOREIGN PATENTS 884,624  12/1961  Great Britain.

WILLIAM D. MARTIN, *Primary Examiner.*

R. HUSACK, *Assistant Examiner.*

U.S. Cl. X.R.

117—132, 89; 161—186; 260—28